(12) United States Patent
Homma

(10) Patent No.: US 12,513,400 B2
(45) Date of Patent: Dec. 30, 2025

(54) CONTROL APPARATUS, OPTICAL APPARATUS, AND CONTROL METHOD

(71) Applicant: CANON KABUSHIKI KAISHA, Tokyo (JP)

(72) Inventor: Taiki Homma, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 18/753,263

(22) Filed: Jun. 25, 2024

(65) Prior Publication Data

US 2025/0063256 A1 Feb. 20, 2025

(30) Foreign Application Priority Data

Aug. 14, 2023 (JP) .................. 2023-131882

(51) Int. Cl.
*H04N 23/69* (2023.01)
*H04N 23/65* (2023.01)
*H04N 23/667* (2023.01)

(52) U.S. Cl.
CPC .......... *H04N 23/69* (2023.01); *H04N 23/651* (2023.01); *H04N 23/667* (2023.01)

(58) Field of Classification Search
CPC ..... H04N 23/69; H04N 23/651; H04N 23/667
USPC ....................................... 348/335
See application file for complete search history.

(56) References Cited

U.S. PATENT DOCUMENTS

| | | | | |
|---|---|---|---|---|
| 9,086,612 B2* | 7/2015 | Korekuni | ............ | G03B 31/00 |
| 10,270,956 B2* | 4/2019 | Isono | ............ | G03B 13/36 |
| 11,388,328 B2* | 7/2022 | Shingu | ............ | H04N 23/661 |
| 11,388,342 B2* | 7/2022 | Homma | ............ | G02B 7/008 |
| 12,332,545 B2* | 6/2025 | Takanashi | ............ | H04N 23/55 |
| 2011/0063461 A1* | 3/2011 | Masuda | ............ | H04N 23/66 381/94.1 |
| 2012/0060614 A1* | 3/2012 | Yoshida | ............ | H04N 5/772 73/649 |
| 2012/0321288 A1* | 12/2012 | Ishibashi | ............ | G02B 7/365 396/111 |
| 2013/0088632 A1* | 4/2013 | Korekuni | ............ | G03B 17/14 348/335 |
| 2015/0215515 A1* | 7/2015 | Isono | ............ | H04N 23/55 359/823 |
| 2016/0269617 A1* | 9/2016 | Tomita | ............ | H04N 23/663 |

(Continued)

FOREIGN PATENT DOCUMENTS

JP 2018072613 A 5/2018

*Primary Examiner* — Pritham D Prabhakher

(74) *Attorney, Agent, or Firm* — ROSSI, KIMMS & McDOWELL LLP

(57) ABSTRACT

A control apparatus controls a drive speed of a movable optical member of an optical apparatus based on operation information on an operation member by setting first control that has a first speed as a maximum speed, and second control that has a second speed lower than the first speed as a maximum speed. The control apparatus provides a first speed range for making equal drive speeds for the same operation information, and a second speed range for making different the drive speeds for the same operation information, which is higher than the first speed range, and sets the first control in a case where a state of power available to the optical apparatus is a first state, and the second control in a case where the state of the power is a second state lower than the first state.

18 Claims, 7 Drawing Sheets

(56) References Cited

U.S. PATENT DOCUMENTS

| | | | |
|---|---|---|---|
| 2017/0195550 A1* | 7/2017 | Kim | G06F 3/0483 |
| 2018/0081148 A1* | 3/2018 | Tomita | G03B 17/14 |
| 2021/0201888 A1* | 7/2021 | Bradshaw | G10L 15/02 |
| 2023/0101440 A1* | 3/2023 | Takanashi | H04N 23/663 |
| | | | 348/207.11 |

* cited by examiner

CONTROL APPARATUS, OPTICAL APPARATUS, AND CONTROL METHOD

BACKGROUND

Technical Field

One of the aspects of the embodiments relates to a lens control apparatus configured to control drive speed of a movable optical member, such as a lens.

Description of Related Art

A lens apparatus that is used for imaging includes a movable optical member such as a zoom lens, a focus lens, and an aperture stop, and controls a drive speed of the movable optical member according to an operation of an operation member by the user.

Japanese Patent Laid-Open No. 2018-072613 discloses a lens control apparatus that enables the user to set a maximum speed in a case where an operation amount of the operation member is maximum, and controls a drive speed in a low-speed range in a case where the operation amount of the operation member is small so that it is equal regardless of the setting of the maximum speed.

However, even in the lens control apparatus that enables the user to set the maximum speed of the movable optical member, if the available power to the lens apparatus is low, the maximum speed may be limited without notifying the user. In addition, during moving image recording as a usage state of the lens apparatus, the maximum speed is to be limited for the silent drive of the movable optical member to prevent the drive noise of the movable optical member from being recorded, regardless of the user setting of the maximum speed. In a case where the maximum speed is thus limited regardless of the user setting, the user may feel a change in the operability of the lens apparatus.

SUMMARY

A control apparatus according to one aspect of the disclosure includes a memory storing instructions, and a processor configured to execute the instructions to control a drive speed of a movable optical member of an optical apparatus based on operation information on an operation member configured to drive the movable optical member of the optical apparatus, and set first control for controlling the drive speed by setting a first speed as a maximum speed, and second control for controlling the drive speed by setting a second speed lower than the first speed as a maximum speed. The processor is configured to control the drive speed, in the first control and the second control, by providing a first speed range for making equal drive speeds for the same operation information, and a second speed range for making different the drive speeds for the same operation information, which is higher than the first speed range. The processor is configured to set the first control in a case where a state of power available to the optical apparatus is a first state, and the second control in a case where the state of the power is a second state lower than the first state. Alternatively, the processor is configured to set the first control in a case where silent drive of the movable optical member is required, and the second control in a case where the silent drive is not required. An optical apparatus having the above control apparatus also constitutes another aspect of the disclosure. A control method corresponding to the above control apparatus also constitutes another aspect of the disclosure. A storage medium storing a program that causes a computer to execute the above control method also constitutes another aspect of the disclosure.

Further features of various embodiments of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Example 1

Figure 1:
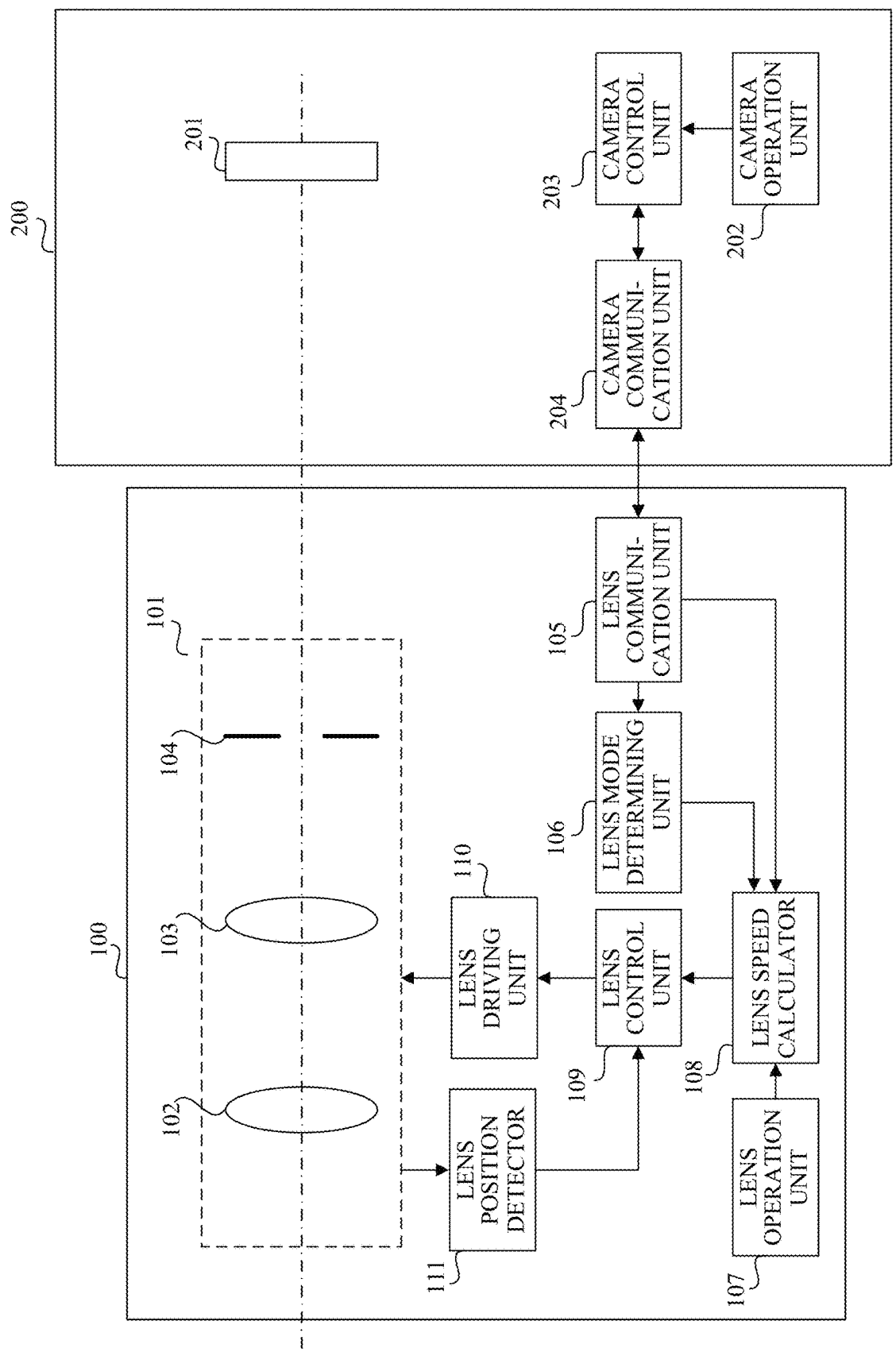
FIG. 1 is a block diagram illustrating the configuration of a lens control apparatus according to Example 1.

FIG. 1 illustrates the configuration of a lens interchangeable type camera system that includes a lens apparatus 100 as an optical apparatus including a control apparatus according to Example 1, and a camera apparatus 200 to which the lens apparatus 100 is detachably attached. In this example, a maximum speed of a drive speed of a zoom lens 103 (referred to as a zoom drive speed hereinafter) is changed depending on an available power state to the lens apparatus 100.

The lens apparatus 100 includes an optical system 101. The optical system 101 images a light beam incident from an object on an image sensor 201 of the camera apparatus 200. The optical system 101 includes a focus lens 102, a zoom lens 103, and an aperture stop (diaphragm) 104, each of which serves as a movable optical member. The focus lens 102 moves in the optical axis direction to change the position of the image plane of the optical system 101 for focusing. The zoom lens 103 moves in the optical axis direction to change the focal length (angle of view) of the optical system 101 in two zoom directions, i.e., a telephoto (TELE) direction and a wide-angle (WIDE) direction. The aperture stop 104 adjusts a light amount incident on the image sensor 201 from the optical system 101. The lens apparatus 100 operates by receiving power from the camera apparatus 200. In this example, the drive of the zoom lens 103 is controlled.

In the camera apparatus 200, the image sensor 201 photoelectrically converts (captures) an object image formed on its imaging surface to generate still image data or moving image data. The camera operation unit 202 has an operation member operable by a user, and transmits camera operation information corresponding to the operation of the operation member to the camera control unit 203. The camera operation information includes information on an operation amount of the operation member or a target value (drive command value) of the drive speed of the zoom lens 103.

Upon receiving the camera operation information, the camera control unit 203 causes a lens control unit 109 of the lens apparatus 100 to start drive control of the zoom lens 103 or to control the drive speed in accordance with the drive command value. The camera control unit 203 also sets an operation mode of the camera apparatus 200 (normal mode, power saving mode, etc.) according to the user's operation. The operation mode of the camera apparatus 200 is stored as camera setting information.

The camera operation unit 202 may be attached to the camera apparatus 200 as illustrated in FIG. 1, or may be an external device such as a remote controller connected to the camera apparatus 200. The camera operation unit 202 may be divided into a part attached to the camera apparatus 200 and a part configured as an external device.

The camera control unit 203 transmits the camera operation information, camera setting information, camera power information, and the like to a camera communication unit 204 and a lens communication unit 105 of the lens apparatus 100. The camera power information indicates a state of power suppliable from the camera apparatus 200 to the lens apparatus 100 (i.e., that the lens apparatus 100 can use).

The lens communication unit 105 transmits the camera operation information received from the camera communication unit 204 to a lens speed calculator 108. The lens communication unit 105 transmits the camera setting information and camera power information received from the camera communication unit 204 to a lens mode determining unit 106. Various information required for imaging is communicated via the camera communication unit 204 and the lens communication unit 105. The lens communication unit 105 transmits position information on the focus lens 102, the zoom lens 103, and the aperture stop 104, optical characteristic information on the optical system 101, and the like to the camera control unit 203 via the camera communication unit 204.

The lens mode determining unit 106 as a setting unit sets the mode of the lens apparatus 100 (referred to as a lens drive mode hereinafter) from the camera setting information and the camera power information. More specifically, in a case where the camera power information does not indicate a decrease in the remaining battery level of the camera apparatus 200 or the camera setting information does not indicate the setting of the power saving mode, the lens drive mode is set to a first drive mode (mode in which the first control is performed) as a normal mode in which the maximum speed is not limited. On the other hand, in a case where the camera power information indicates a decrease in the remaining battery level or in a case where the camera setting information indicates the setting of the power saving mode, the lens drive mode is set to a second drive mode (mode in which the second control is performed) as a speed limit mode in which the maximum speed is limited. In a case where an unillustrated external power source is connected to the lens apparatus 100, the lens drive mode may be set to a first drive mode that does not limit the maximum speed of the zoom drive speed, regardless of the camera power information or camera setting information.

A description will be given later of details of the processing performed here. In this example, the lens drive mode is determined in the lens apparatus 100, but the camera apparatus 200 may determine the lens drive mode and transmit the determined lens drive mode to the lens apparatus 100 to set the lens apparatus 100 to that lens drive mode.

A lens operation unit 107 includes an operation member operable by a user, and transmits lens operation information corresponding to the operation of the operation member to the lens speed calculator 108. The lens operation information includes information on the operation amount of the operation member or the drive command value of the zoom lens 103.

The lens operation unit 107 may be provided to the lens apparatus 100 as illustrated in FIG. 1, or may be an external device such as a remote controller connected to the lens apparatus 100. The lens operation unit 107 may be divided into a part provided to the lens apparatus 100 and a part configured as an external device.

The lens speed calculator 108 determines the zoom drive speed from the camera operation information or lens operation information transmitted from the camera operation unit 202 (camera control unit 203) or the lens operation unit 107 and the lens drive mode determined by the lens mode determining unit 106. It transmits the determined zoom drive speed to the lens control unit 109. More specifically, the lens speed calculator 108 changes the way in which the zoom drive speed is changed (speed control characteristic) relative to the operation information for each lens drive mode according to the type of the camera operation unit 202 or the lens operation unit 107 as an operation member and its operation form. The type of the operation member includes a press operation type, a rotational operation type, a lever operation type, a touch operation type, etc. The operation form includes a form in which the zoom direction and zoom drive speed are set by operating a single operation member, a form in which the zoom direction and zoom drive speed are set by combining operations of a plurality of operation members, etc.

The lens speed calculator 108 determines the same zoom drive speed for the same operation information for the same type or operation form of the operation member, regardless of the lens drive mode. Even if the type or operation form of the operation member is the same, a different zoom drive speed is determined for the same operation information according to the lens drive mode. A description will be given later of details of the zoom drive speed determined by the lens speed calculator 108.

A lens drive unit 110 includes an actuator such as a DC motor, and drives the zoom lens 103 based on a drive signal from the lens control unit 109. The lens drive unit 110 further includes an actuator that drives the focus lens 102 and an actuator that drives the aperture stop 104.

A lens position detector 111 includes a position sensor such as an encoder, and detects the position of the zoom lens 103 in the optical axis direction (referred to as a zoom position hereinafter), and transmits the lens position information to the lens control unit 109 or the camera control unit 203. The lens position detector 111 further includes a position sensor that detects the position of the focus lens 102 and a position sensor that detects the position of the aperture stop 104.

The lens control unit 109 outputs a drive signal to the lens drive unit 110 so that the zoom lens 103 is driven at the zoom drive speed determined by the lens speed calculator 108. That is, it controls the drive of the zoom lens 103 (referred to as zoom drive control hereinafter). At this time, the lens control unit 109 performs feedback control using the position of the zoom lens 103 (lens position information) detected by the lens position detector 111. The lens speed calculator 108 and the lens control unit 109 constitute a speed control unit.

Figure 2:
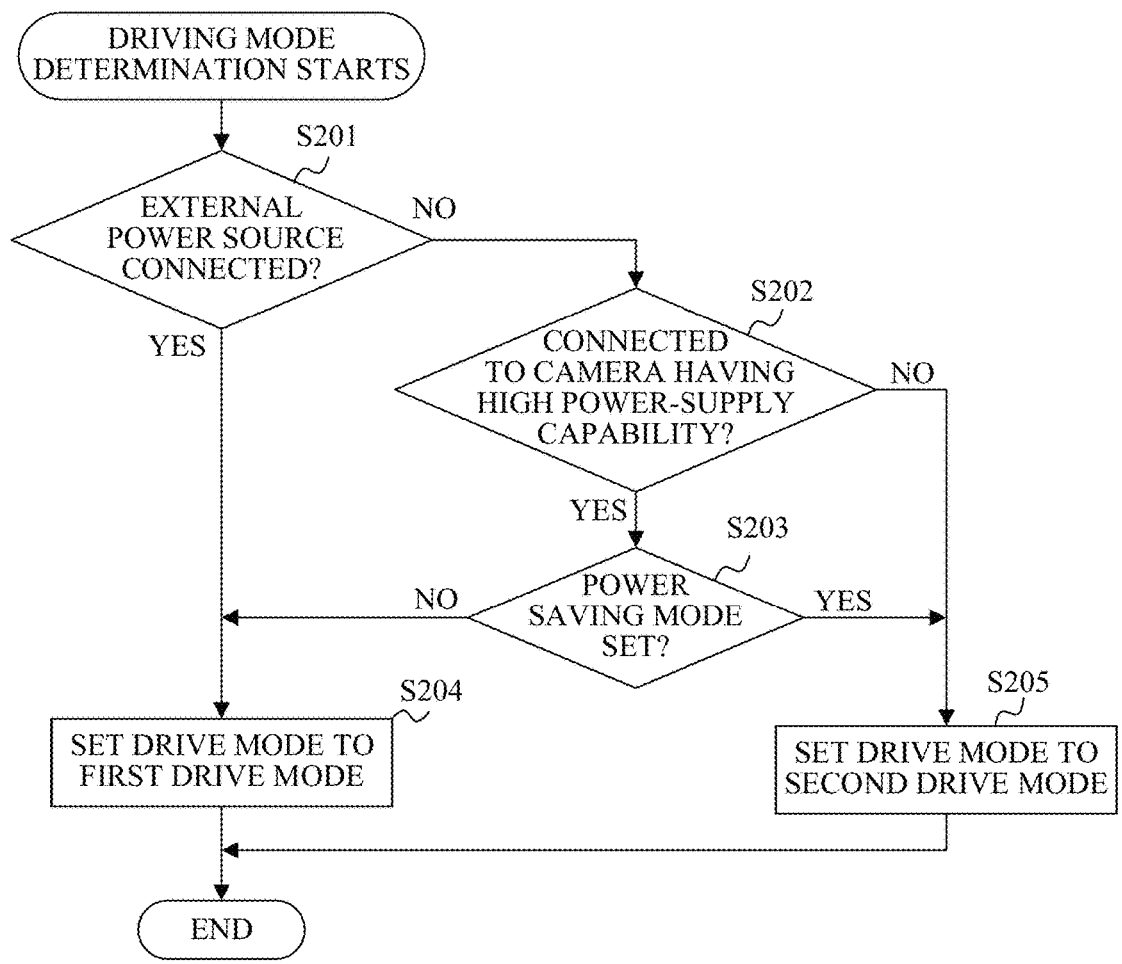
FIG. 2 is a flowchart illustrating determining processing of a drive mode according to Example 1.

The flowchart in FIG. 2 illustrates processing in which the lens mode determining unit 106 determines the lens drive mode according to Example 1. The lens mode determining unit 106, together with the lens speed calculator 108 and the lens control unit 109, includes a computer including one or more processors, and executes this processing according to a program.

In step S201, the lens mode determining unit 106 determines whether or not an external power source capable of supplying power to the lens apparatus 100 is connected to at least one of the lens apparatus 100 and the camera apparatus 200 (first state). In a case where the external power source is connected, the flow proceeds to step S204. In a case where the external power source is not connected (second state), the flow proceeds to step S202.

In step S202, the lens mode determining unit 106 determines whether the camera apparatus 200 to which the lens apparatus 100 is attached is in a high power-supply capability state (first state) to the lens apparatus 100. In a case where the camera apparatus 200 is in the high power-supply capability state, the flow proceeds to step S203. In a case where the camera apparatus 200 is in the low power-supply capability state (second state), the flow proceeds to step S205. The low power-supply capability state includes a state in which the remaining battery level of the camera apparatus 200 is lower than a predetermined level, and a state in which the remaining battery level is higher than a predetermined level but the suppliable power to the lens apparatus 100 is low.

In step S203, the lens mode determining unit 106 determines whether a power saving mode is set in the camera apparatus 200 (first state in which power saving operation is required). In a case where the power saving mode is set, the flow proceeds to step S205. In a case where the power saving mode is not set (second state), the flow proceeds to step S204.

In step S204, the lens mode determining unit 106 sets the lens drive mode to the first drive mode. The first drive mode is the normal mode described above. After this, the lens mode determining unit 106 ends this flow.

In step S205, the lens mode determining unit 106 sets the lens drive mode to the second drive mode. The second drive mode is a mode for setting the maximum speed lower than that of the first drive mode. Thereafter, the lens mode determining unit 106 ends this flow.

While FIG. 2 illustrates a case in which the lens drive mode is set according to the three determination conditions illustrated in steps S201 to S203, the lens drive mode may be set based on only one of the three determination conditions. In FIG. 2, two lens drive modes are set, but three or more lens drive modes each having a different maximum speed may be set.

Figure 3:
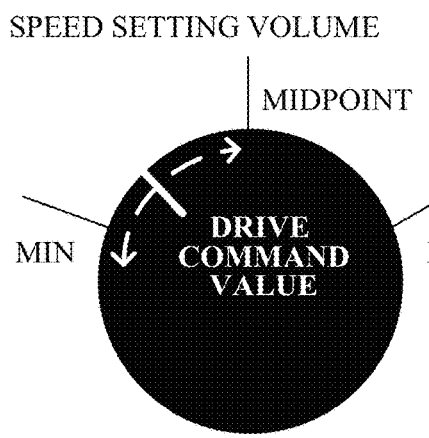
FIG. 3 illustrates a zoom operation member according to Example 1.
Figure 3:
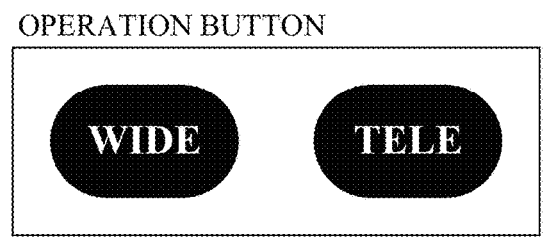

FIG. 3 illustrates a speed setting volume and an operation button as examples of operation members. These operation members may be included in the lens operation unit 107 or the camera operation unit 202.

The speed setting volume is an operation member for outputting a drive command value for setting the zoom drive speed from a minimum (lowest) value to a maximum (highest) value according to a rotational position of a knob (rotational operation amount). A mechanism that generates a mark or a click feeling may be provided so that the knob is easily held at the midpoint position as a reference position.

The operation button is an operation member that can be pressed down for each of the TELE and WIDE zoom directions. The operation form of these speed setting volume and operation button is that the user sets a desired zoom drive speed (drive command value) with the speed setting volume and then presses the operation button (TELE or WIDE) in the desired zoom direction. In a case where the operation button is pressed down, the zoom lens 103 can be driven at the zoom drive speed set by the speed setting volume in the zoom direction corresponding to the operation button pressed during that period.

Figure 4:
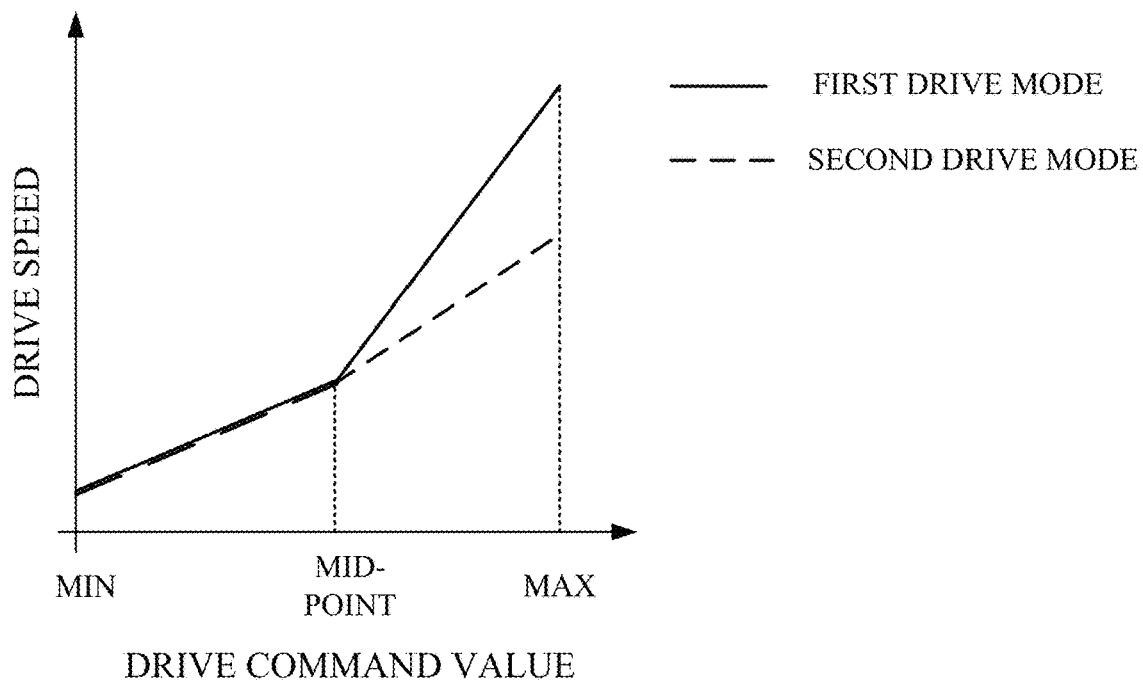
FIG. 4 illustrates a relationship between an operation of the zoom operation member and a drive speed in Example 1.

FIG. 4 illustrates a relationship (speed control characteristic) between a drive command value and a zoom drive speed according to a rotational operation amount of the speed setting volume and an operation of the operation button illustrated in FIG. 3. A horizontal axis represents a drive command value set by the speed setting volume, and a vertical axis represents zoom drive speeds when the operation button is pressed in the first and second drive modes. Basically, the zoom drive speed increases as the drive command value increases. The maximum speed (second speed) in the second drive mode is set lower than the maximum speed (first speed) in the first drive mode.

In a case where the speed setting volume is operated to a low-speed range (first speed range) between a minimum value and a midpoint value, it is assumed that the user is requesting zoom drive control in the low-speed range, and zoom drive control is performed at the same zoom drive speed for the same drive command value in both the first and second drive modes. The same drive speed here may be completely the same, or may differ within a range that the user feels is the same. This is similarly applicable to other examples described later. By performing zoom drive control in such a low-speed range, even if the maximum speed of the zoom drive speed changes (the lens drive mode is switched), zoom operability in the low-speed range, i.e., change in zoom drive speed relative to an operation of the speed setting volume, can be almost eliminated.

On the other hand, in a case where the speed setting volume is operated to a high-speed range (second speed range) between the midpoint value and a maximum value, zoom drive control is performed so that the zoom drive speed changes according to the drive command value up to the maximum speed in each of the first and second drive modes.

Figure 5:
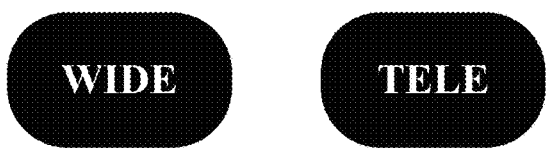
FIG. 5 illustrates another zoom operation member according to Example 1.

FIG. 5 illustrates a speed setting menu and operation buttons according to another example of the operation member. These operation members may also be included in either the lens operation unit 107 or the camera operation unit 202.

The speed setting menu is displayed, for example, on a display unit that allows a touch operation. In the example of FIG. 5, the zoom drive speed setting (drive setting) can be selected among two steps, high speed and low speed, and the zoom drive speed (drive command value) for each drive setting can be selected among 10 steps (or levels), from speed 1 to speed 10. The operation buttons are the same as those illustrated in FIG. 3. The operation form of these speed setting menus and operation buttons is that the user sets a desired drive setting (high speed or low speed) and a desired zoom drive speed in the speed setting menu, and then presses the operation button for the desired zoom direction (TELE or WIDE). In a case where the operation button is pressed, the zoom lens 103 can be driven at the zoom drive speed at the drive setting set in the speed setting menu in the zoom direction corresponding to the pressed operation button.

Figure 6A:
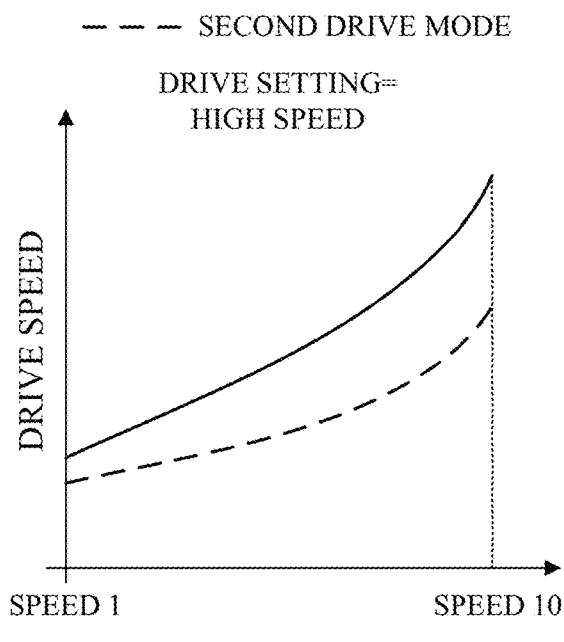
FIGS. 6A and 6B illustrate a relationship between an operation of the other zoom operation member and a drive speed in Example 1.
Figure 6B:
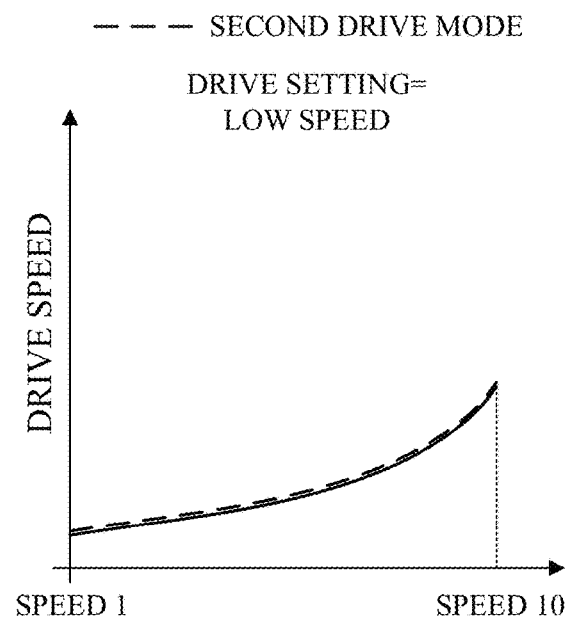

FIGS. 6A and 6B illustrate a relationship (speed control characteristics) between a drive command value and a zoom drive speed according to the operation of the speed setting menu and operation buttons illustrated in FIG. 5. FIG. 6A illustrates a case where high speed (second speed range) is set in the drive setting of the speed setting menu, and FIG. 6B illustrates a case where low speed (first speed range) is set. A horizontal axis of each of FIGS. 6A and 6B represent a drive command value set in the speed setting menu, and a vertical axis represents zoom drive speeds when the operation button is pressed in the first and second drive modes. Basically, the zoom drive speed increases as the drive command value increases.

In a case where the drive setting sets a high speed, zoom drive control is performed so that the zoom drive speed changes according to the drive command value at all speeds from speed 1 to speed 10, up to the maximum speeds (first and second speeds) of the first and second drive modes.

In a case where the drive setting sets a low speed, zoom drive control is performed at the same zoom drive speed for the same drive command value at all speeds from speed 1 to speed 10, in both the first and second drive modes.

Thus, for a specific type or operation form of the operation member (combination of the speed setting menu and the operation buttons), the speed control characteristic may be changed so that the drive speed is controlled in only selected one of the speed ranges, rather than continuously from the first speed range to the second speed range, as illustrated in FIG. 4.

Figure 7:
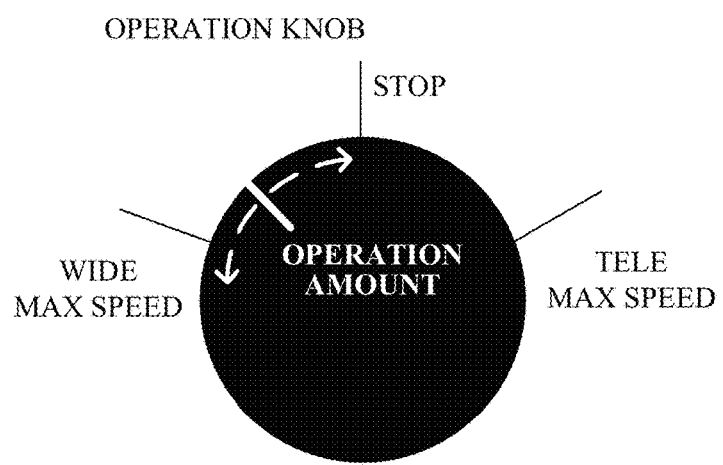
FIG. 7 illustrates still another zoom operation member according to Example 1.

FIG. 7 illustrates an operation knob according to still another example of the operation member. This operation member may also be included in either the lens operation unit 107 or the camera operation unit 202.

The operation knob is an operation member that can set a drive command value according to a rotational operation amount and set a zoom direction according to the rotating direction. The operation form of the operation knob is that the user rotates the operation knob in a rotating direction corresponding to a desired zoom direction to a position (operation amount) corresponding to a desired zoom drive speed. For example, the TELE direction is set by rotating the operation knob clockwise from the 0 position (stop), and a drive command value from 0 to the maximum speed is set according to the rotational operation amount from the 0 position. The WIDE direction is set by rotating the operation knob counterclockwise from the 0 position, and a drive command value from 0 to the maximum speed is set according to the rotational operation amount from the 0 position. The operation knob may be configured to automatically return to the 0 position in a case where the operation knob is not operated.

Figure 8:
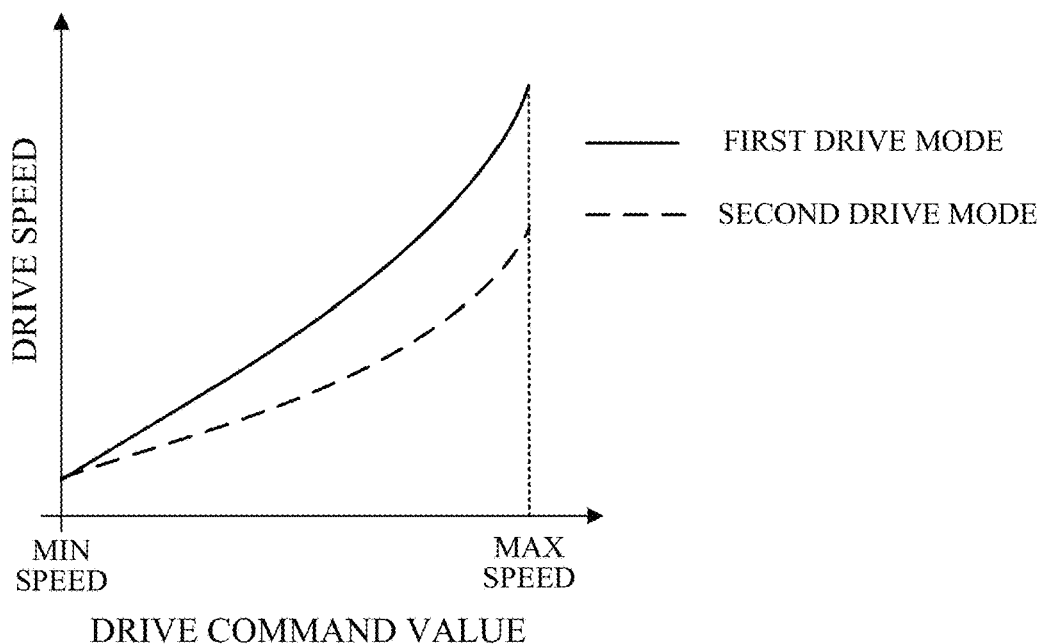
FIG. 8 illustrates a relationship between an operation of the other zoom operation member and a drive speed in Example 1.

FIG. 8 illustrates a relationship (speed control characteristic) between a drive command value according to a rotational operation amount of the operation knob illustrated in FIG. 7 and a zoom drive speed. A horizontal axis represents a drive command value set by the operation knob, and a vertical axis represents zoom drive speeds in the first and second drive modes. Basically, the zoom drive speed increases as the drive command value increases.

In a case where the drive command value has a value corresponding to the minimum speed (first speed range), zoom drive control is performed at the same zoom drive speed in both the first and second drive modes. In a case where the drive command value has a value corresponding to a speed higher than the minimum speed (second speed range), zoom drive control is performed so that the zoom drive speed changes according to the drive command value up to the maximum speed in each of the first and second drive modes. As illustrated in FIGS. 8 and 4, the speed control characteristic may be changed so that the speed at which the first speed range and the second speed range are switched may be changed according to the type and operation form of the operation member.

As described above, in this example, the lens apparatus 100 switches the maximum speed according to the available power state. Even in a case where the maximum speed is limited according to the power state (the second drive mode has been set), the lens apparatus 100 can perform zoom drive control in a specific speed range (first speed range) without degrading zoom operability (a relationship between an operation of the operation member and a zoom drive speed). Thereby, even if the maximum speed of the zoom drive speed is limited for reasons unintended by the user, such as a drop in the remaining battery level of the camera apparatus 200, the zoom drive speed in the low-speed range does not change relative to the operation of the operation member, and excellent zoom operability in slow zooming can be maintained.

In the zoom drive control illustrated in FIG. 4, the user may be allowed to set a range of a drive command value (first speed range from minimum to midpoint) for making the zoom drive speed common in the first and second drive modes. The zoom drive speed in the first and second drive modes may be made common in a range of all drive command values. The user may be allowed to set whether the zoom drive speed in the first and second drive modes is common only in the set drive command value range or in the range of all drive command values.

In addition, in FIGS. 3 and 5, the operation of the speed setting volume or speed setting menu for setting the drive command value is separate from the operation of the operation button for instructing the drive start. In this case, it is difficult to immediately change the drive speed in a case where the drive speed is not a speed intended by the user after the drive starts.

On the other hand, in the case where the drive start is instructed by a rotational operation of the operation knob as illustrated in FIG. 7 and the drive speed is set by a rotational operation amount, unless the drive speed is the one intended by the user after the drive starts, the drive speed can be adjusted by immediately changing the rotational operation amount. For each of the operation members with different types and operation forms, the speed control characteristic for the operation information may be changed, such as a range of drive command value (first speed range) that provides the same drive speed for the same operation information in both the first and second drive modes. Thereby, excellent zoom operability can be maintained without complicated settings even when the maximum speed changes according to the available power state to the lens apparatus 100.

Example 2

A description will now be given of Example 2. In Example 2, the maximum speed of the zoom drive speed is changed according to whether or not silent drive of the zoom lens 103 is performed so that the zoom drive noise generated by the drive of the zoom lens 103 is not recorded during moving image recording. The configurations of the lens apparatus 100 and the camera apparatus 200 in this example are basically the same as those of Example 1. However, in Example 2, the camera apparatus 200 (camera operation unit 202) is configured to be able to set a silent mode for silently driving the zoom lens 103 in addition to the power saving mode. The camera control unit 203 can communicate to the lens apparatus 100 the setting of the camera apparatus 200 (whether it is in the silent mode or not) and the imaging status of the camera apparatus 200 (whether it is in a still image capturing mode or a moving image capturing mode, or during moving image recording, etc.).

Figure 9:
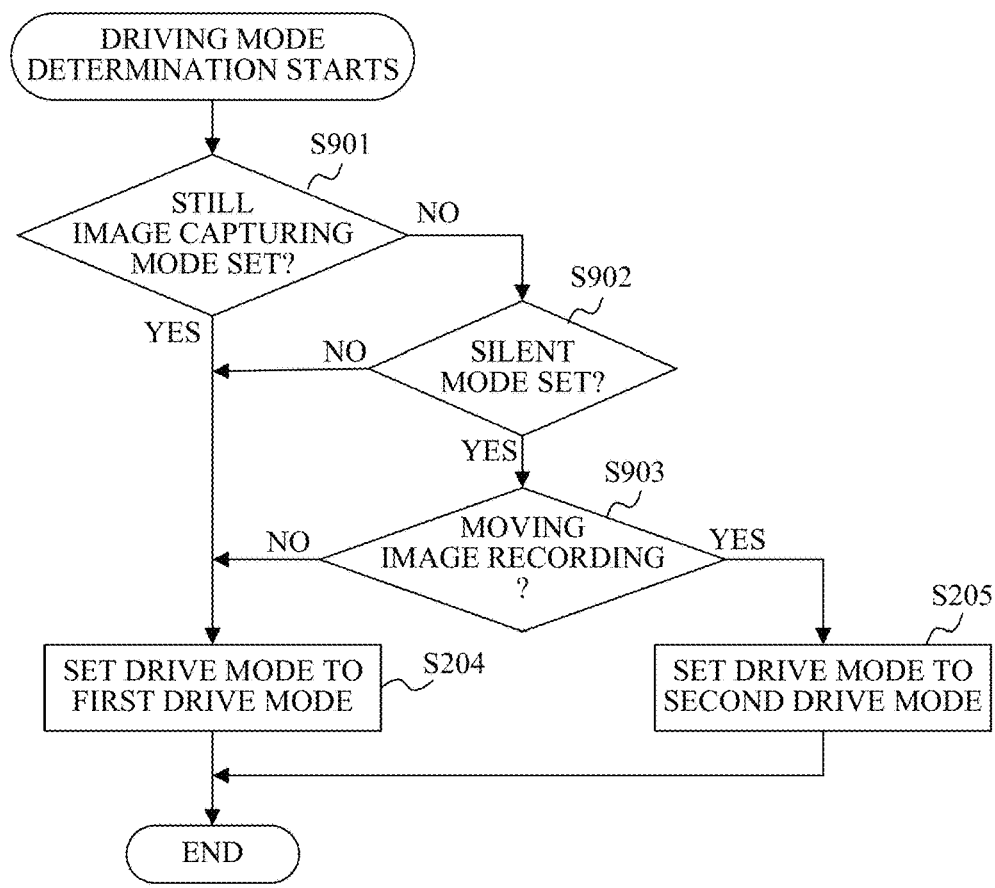
FIG. 9 is a flowchart illustrating determining processing of the drive mode according to Example 2.

A flowchart in FIG. 9 illustrates processing according to Example 2 in which the lens mode determining unit 106 determines the lens drive mode.

In step S901, the lens mode determining unit 106 determines whether the camera apparatus 200 is set to the still image capturing mode or moving image capturing mode. In a case where it is set to the still image capturing mode, the flow proceeds to step S204, and in a case where it is set to the moving image capturing mode, the flow proceeds to step S902.

In step S902, the lens mode determining unit 106 determines whether or not the camera apparatus 200 is set to the silent mode. In a case where the silent mode is set, the flow proceeds to step S903. In a case where the silent mode is not set, the flow proceeds to step S204.

In step S903, the lens mode determining unit 106 determines whether the camera apparatus 200 is recording a moving image. In a case where it is recording a moving image, the flow proceeds to step S205. In a case where it is not recording a moving image, the flow proceeds to step S204.

Steps S204 and S205 are the same as steps S204 and S205 in FIG. 2, respectively. In the second drive mode set in step S205, the maximum speed of the zoom drive speed is limited, and thus the zoom lens 103 can be silently driven.

In FIG. 9, the lens drive mode is set according to the three determination conditions illustrated in steps S901 to S903, but the lens drive mode may be set based on only one of the three determination conditions. In FIG. 9, two lens drive modes are set, but three or more lens drive modes with different maximum speeds may be set.

Whether an external microphone is used (the external microphone is connected to the camera apparatus 200) may be determined during imaging, and in a case where the external microphone is used, the first drive mode may be set regardless of the setting of the camera apparatus 200 or the imaging situation. The external microphone records at a position outside the camera apparatus 200 where the zoom drive noise is not detected.

Figure 10:
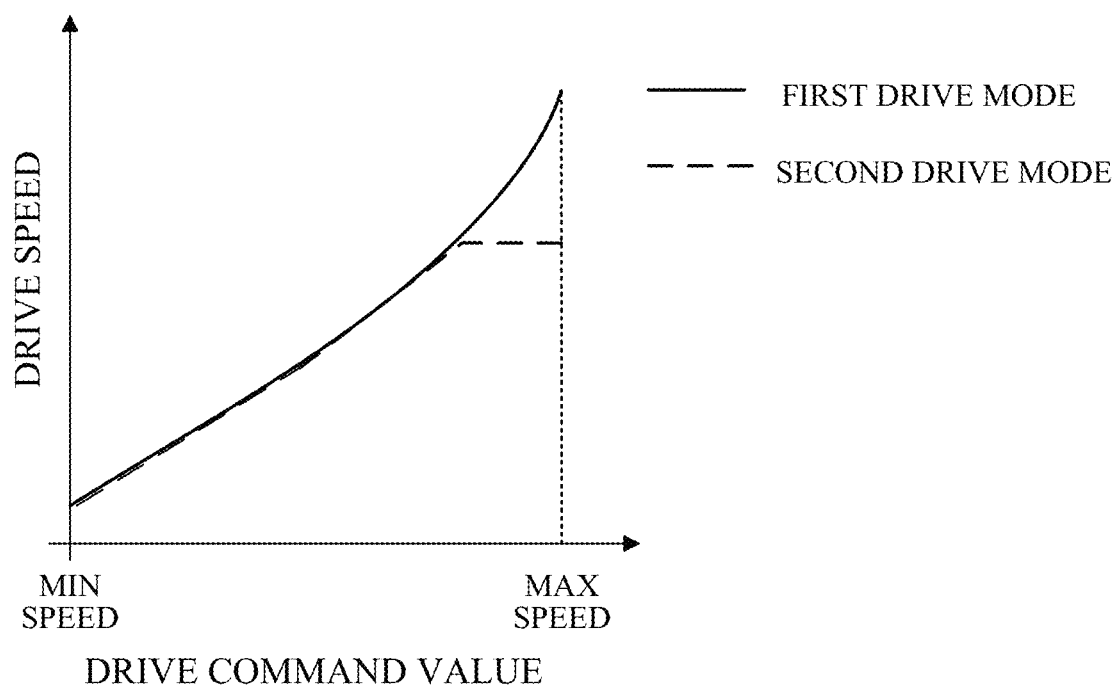
FIG. 10 illustrates a relationship between an operation of a zoom operation member and a drive speed in Example 2.

FIG. 10 illustrates a relationship between a drive command value according to a rotational operation amount of the operation knob illustrated in FIG. 7 and a zoom drive speed, as an example of a relationship between an operation of the operation member and a zoom drive speed in Example 2. A horizontal axis represents a drive command value set by the operation knob, and a vertical axis represents zoom drive speeds in the first and second drive modes. Basically, the zoom drive speed increases as the drive command value increases.

In a case where a drive command value has a value corresponding to a speed (first speed range) from the lowest speed to a speed just before the maximum speed, zoom drive control is performed at the same zoom drive speed for the same drive command value in both the first and second drive modes. In a case where the drive command value has a value corresponding to a speed (second speed range) from a speed just before the maximum speed to the maximum speed, zoom drive control is performed so that the zoom drive speed changes according to the drive command value up to the maximum speed in each of the first and second drive modes.

Thus, zoom drive control is performed at the same zoom drive speed for the same drive command value in both the first and second drive modes in a range of all drive command values other than a range in which the maximum speed is limited in the second drive mode. Thereby, the zoom drive speed can be limited so that the drive noise is not recorded during moving image recording, and high-speed zooming can be secured during non-recording.

As described above, in this example, the maximum speed of the zoom drive speed is switched according to whether or not the zoom lens 103 is silently driven. Even in a case where the maximum speed is limited for silent drive (the second drive mode has been set), zoom drive control can be performed without deteriorating zoom operability.

The determination condition according to this example and the determination condition described in Example 1 may be combined to select the second drive mode in a case where the silent mode or power saving mode is set and the power supply capacity of the camera apparatus 200 is high. In this case, a relationship between the drive command value and the zoom drive speed may be different between the case where the maximum speed is limited in the silent mode and the case where the maximum speed is limited in the power saving mode, as illustrated in FIGS. 10 and 8.

In Examples 1 and 2, the control apparatus includes the lens mode determining unit 106, the lens speed calculator 108, and the lens control unit 109 provided in the lens apparatus 100, but a similar control apparatus may be configured in the camera apparatus as an optical apparatus.

In Examples 1 and 2, the lens interchangeable type camera system is used as an example, but the processing illustrated in FIGS. 2 and 9 can also be applied to a lens integrated type camera.

Example 3

Figure 11:
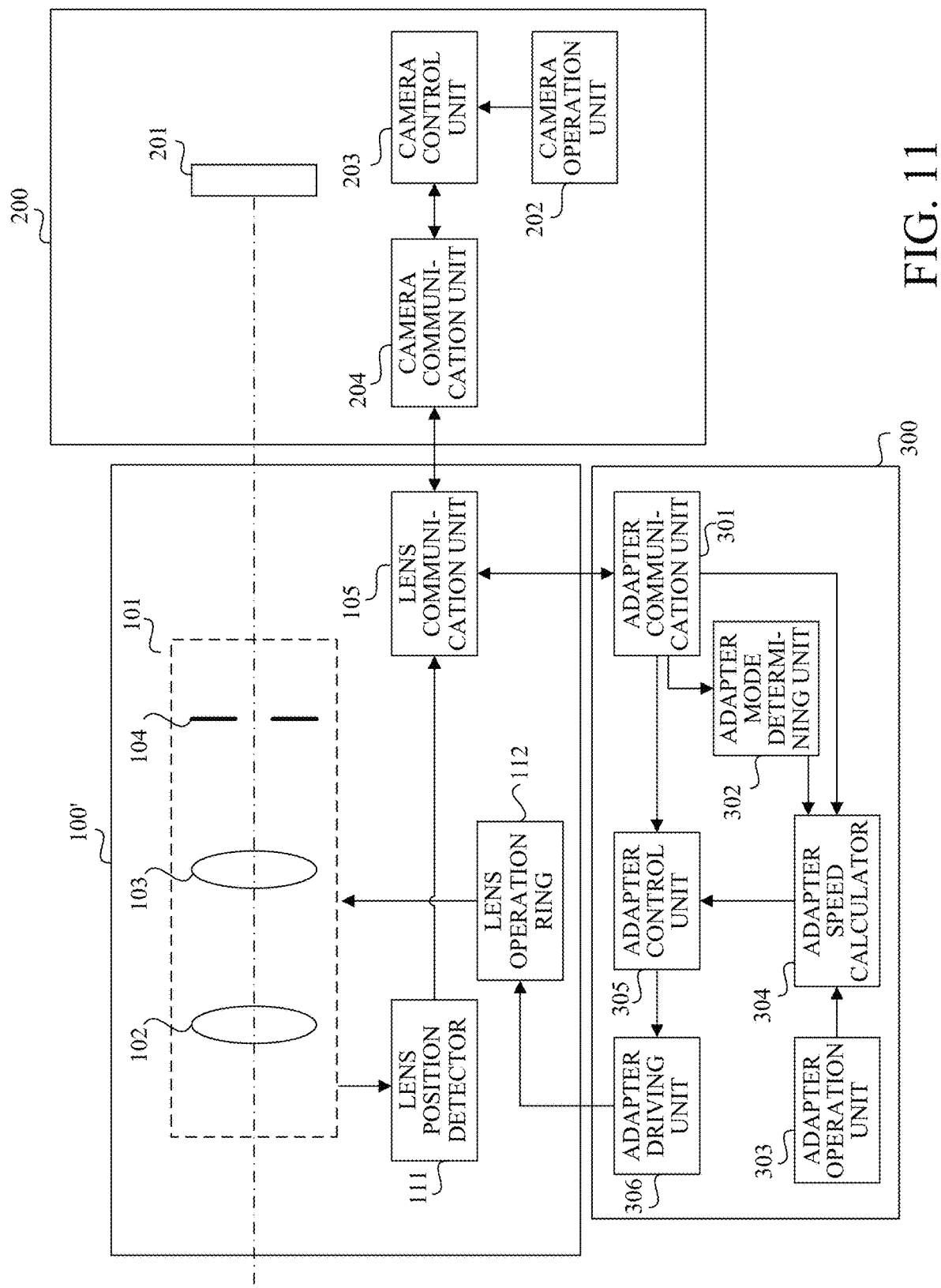
FIG. 11 is a block diagram illustrating the configuration of a lens control apparatus according to Example 3.

A description will now be given of Example 3. FIG. 11 illustrates the configuration of a lens interchangeable type camera system in which the zoom adapter 300 as the control apparatus according to Example 3 is attached to the lens apparatus 100'. Example 3 enables electric zoom drive by attaching the zoom adapter 300 to the lens apparatus 100' in which the zoom lens 103 can be manually driven. Those elements in this example, which are corresponding elements in Examples 1 and 2, will be designated by the same reference numerals.

In the lens apparatus 100', a lens operation ring 112 is an operation member rotatable by the user to manually drive the zoom lens 103 in a case where the zoom adapter 300 is not attached to the lens apparatus 100'. The zoom adapter 300 attached to the lens apparatus 100' rotates the lens operation ring 112 to electrically drive the zoom lens 103.

In the zoom adapter 300, an adapter communication unit 301 communicates with the lens communication unit 105 and the camera communication unit 204 to receive lens position information, lens operation information, camera setting information, camera power information, etc. The adapter communication unit 301 transmits the received lens position information to an adapter control unit 305, the lens operation information to an adapter speed calculator 304, and the camera setting information and camera power information to an adapter mode determining unit 302.

The adapter mode determining unit 302 as a setting unit determines whether or not to limit the maximum speed of the zoom drive speed based on the camera setting information and the camera power information, and transmits the determination result to the adapter speed calculator 304. The adapter mode determining unit 302 has the same role as that of the lens mode determining unit 106 described in Examples 1 and 2. That is, in Example 3, the adapter mode determining unit 302 executes the processing in FIGS. 2 and 9.

The adapter operation unit 303 is an operation member for accepting an operation by the user to set the zoom drive speed and instruct the start of the zoom drive control. Adapter operation information according to the operation of the adapter operation unit 303 is transmitted to the adapter speed calculator 304. The adapter operation unit 303 may be provided to the zoom adapter 300 as illustrated in FIG. 11, or may be an external device such as a remote controller connected to the zoom adapter 300. The adapter operation unit 303 may be divided into a part provided to the zoom adapter 300 and a part configured as an external device. The lens apparatus 100' may have a lens operation unit as in Examples 1 and 2.

An adapter speed calculator 304 determines the zoom drive speed according to the lens operation information transmitted from the camera operation unit 202 and the adapter operation unit 303 and the lens drive mode set by the adapter mode determining unit 302, and transmits it to the adapter control unit 305. The adapter speed calculator 304 has the same role as that of the lens speed calculator 108 in Examples 1 and 2. In Example 3, the adapter speed calculator 304 sets the zoom drive speed described in FIGS. 3 to 8 and 10.

An adapter drive unit 306 includes an actuator such as a DC motor, and drives the lens operation ring 112 based on a drive signal from the adapter control unit 305. In other words, it drives the zoom lens 103.

The adapter control unit 305 outputs a drive signal to the adapter drive unit 306 to perform zoom drive control so that the zoom lens 103 is driven at the zoom drive speed determined by the adapter speed calculator 304. At this time, the adapter control unit 305 performs feedback control using the lens position information transmitted from the adapter communication unit 301. The adapter speed calculator 304 and the adapter control unit 305 constitute a speed control unit.

Even in a case where the zoom adapter 300 is used as in this example, and the maximum speed of the zoom drive speed is limited as described in Examples 1 and 2, zoom drive control can be performed without reducing zoom operability.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can maintain excellent operability of the optical apparatus even if the maximum speed of the movable optical member changes according to on the power status or usage status.

This application claims priority to Japanese Patent Application No. 2023-131882, which was filed on Aug. 14, 2023, and which is hereby incorporated by reference herein in its entirety.

What is claimed is:

1. A control apparatus for a lens apparatus, the control apparatus comprising:
   a memory storing instructions; and
   a processor configured to execute the instructions to:
      control a drive speed of a movable optical member of the lens apparatus based on operation information on an operation member configured to drive the movable optical member of the lens apparatus, and
      set first control for controlling the drive speed by setting a first speed as a maximum speed, and second control for controlling the drive speed by setting a second speed lower than the first speed as a maximum speed,
   wherein the processor is configured to control the drive speed, in the first control and the second control, by providing a first speed range for making equal drive speeds for the same operation information, and a second speed range for making different the drive speeds for the same operation information, which is higher than the first speed range, and
   wherein the processor is configured to set the first control in a case where a state of power available to the lens apparatus is a first state, and the second control in a case where the state of the power is a second state lower than the first state.

2. The control apparatus according to claim 1, wherein the first state includes a state in which the power is supplied to the lens apparatus from an external power source.

3. The control apparatus according to claim 1, wherein:
   the lens apparatus is attachable to a camera apparatus, and
   the second state includes a state in which a remaining level of a battery in the camera apparatus is lower than a predetermined level while the lens apparatus is attached to the camera apparatus.

4. The control apparatus according to claim 1, wherein:
   the lens apparatus is attachable to a camera apparatus, and
   the second state includes a state in which power saving is required for the camera apparatus while the lens apparatus is attached to the camera apparatus.

5. The control apparatus according to claim 1, wherein the processor is configured to change a speed control characteristic of the movable optical member relative to the operation information according to at least one of a type of the operation member or an operation form of the operation member.

6. The control apparatus according to claim 5, wherein:
   changing the speed control characteristic includes changing a speed at which the first speed range and the second speed range are switched, and
   changing whether the drive speed is controlled continuously from the first speed range to the second speed range or only in selected one of the first speed range or the second speed range.

7. The control apparatus according to claim 1, wherein the processor is configured to change the drive speed according to a change in the operation information in the second control.

8. A camera apparatus comprising:
   the control apparatus according to claim 1; and
   an image sensor configured to capture an image of an object.

9. A lens apparatus comprising:
   the control apparatus according to claim 1; and
   the movable optical member.

10. A control apparatus for a lens apparatus, the control apparatus comprising:
    a memory storing instructions; and
    a processor configured to execute the instructions to:
       control a drive speed of a movable optical member of the lens apparatus based on operation information on an operation member configured to drive the movable optical member of the lens apparatus, and
       set first control for controlling the drive speed by setting a first speed as a maximum speed, and second control for controlling the drive speed by setting a second speed lower than the first speed as a maximum speed,
    wherein the processor is configured to control the drive speed, in the first control and the second control, by providing a first speed range for making equal drive speeds for the same operation information, and a second speed range for making different the drive speeds for the same operation information, which is higher than the first speed range, and
    wherein the processor is configured to set the first control in a case where silent drive of the movable optical member is required, and the second control in a case where the silent drive is not required.

11. A lens apparatus comprising:
    the control apparatus according to claim 10; and
    the movable optical member.

12. The control apparatus according to claim 10, wherein the case where the silent drive is required is moving image recording.

13. The control apparatus according to claim 10, wherein the case where the silent drive is required is imaging that does not use a microphone.

14. A camera apparatus comprising:
    the control apparatus according to claim 10, and
    an image sensor configured to capture an image of an object.

15. A method of controlling a lens apparatus, the method comprising the steps of:
    controlling a drive speed of a movable optical member of the lens apparatus based on operation information on an operation member configured to drive the movable optical member of the lens apparatus, and
    setting first control for controlling the drive speed by setting a first speed as a maximum speed, and second control for controlling the drive speed by setting a second speed lower than the first speed as a maximum speed,
    wherein the drive speed is controlled, in the first control and the second control, by providing a first speed range for making equal drive speeds for the same operation information, and a second speed range for making different the drive speeds for the same operation information, which is higher than the first speed range, and
    wherein the first control is set in a case where a state of power available to the lens apparatus is a first state, and the second control is set in a case where the state of the power is a second state lower than the first state.

16. A non-transitory computer-readable storage medium storing a program for causing a computer to execute the control method according to claim 15.

17. A method for controlling a lens apparatus, the method comprising the steps of:
    controlling a drive speed of a movable optical member of the lens apparatus based on operation information on an operation member configured to drive the movable optical member of the lens apparatus, and
    setting first control for controlling the drive speed by setting a first speed as a maximum speed, and second control for controlling the drive speed by setting a second speed lower than the first speed as a maximum speed, wherein the drive speed is controlled, in the first control and the second control, by providing a first speed range for making equal drive speeds for the same operation information, and a second speed range for making different the drive speeds for the same operation information, which is higher than the first speed range, and wherein the first control is set in a case where silent drive of the movable optical member is required, and the second control is set in a case where the silent drive is not required.

18. A non-transitory computer-readable storage medium storing a program for causing a computer to execute the control method according to claim 17.

* * * * *